United States Patent [19]

Porcello et al.

[11] Patent Number: 4,865,859

[45] Date of Patent: Sep. 12, 1989

[54] SOFT SOYBEAN OIL FILLER CREAM COMPOSITIONS

[75] Inventors: Samuel J. Porcello, Toms River; James M. Manns, Glenwood, both of N.J.

[73] Assignee: Nabisco Brands, Inc., Parsippany, N.J.

[21] Appl. No.: 204,988

[22] Filed: Jun. 10, 1988

Related U.S. Application Data

[63] Continuation of Ser. No. 839,552, Mar. 14, 1986, abandoned.

[51] Int. Cl.$^4$ .......................... A23D 5/00; A23G 3/00
[52] U.S. Cl. .................................... 426/250; 426/553; 426/572; 426/607; 426/613; 426/653
[58] Field of Search ................. 426/96, 572, 606, 607, 426/613, 659, 660

[56] References Cited

U.S. PATENT DOCUMENTS 4,711,788 12/1987 Porcello et al. .................... 426/613
4,753,812 6/1988 Wilson et al. ....................... 426/613

Primary Examiner—Jeanette Hunter
Attorney, Agent, or Firm—Richard Kornutik

[57] ABSTRACT

A filler cream for use with sandwich cookies and other foods which is soft at room temperature yet is structurally stable during simulated adverse transport conditions is obtained with an oleaginous composition having a solid fat index of: (a) from about 9 to about 20 percent, preferably from about 11 percent to about 15 percent, at 80 degrees F., (b) from about 4 percent to about 11 percent, preferably from about 5 percent to about 8 percent at 92 degrees F., and (c) from about 1 percent to about 4 percent preferably from about 1 percent to about 3 percent material at 100 degrees F. The ingredients are aerated, mixed, and cooled simultaneously to produce a composition which has a specific gravity of from about 0.70 to about 1.20, preferably from about 0.77 to about 1.0, most preferably from about 0.85 to about 0.95. The filler creams of the present invention exhibit a non-gritty, smooth texture and "quick get away" characteristics.

35 Claims, No Drawings

SOFT SOYBEAN OIL FILLER CREAM COMPOSITIONS

This application is a continuation of 06/839,552 filed 03/14/86, now abandoned.

FIELD OF THE INVENTION

This invention relates to filler creams for baked products, methods for making the filler creams, and to products containing the filler creams.

BACKGROUND OF THE INVENTION

Filler creams have been used in baked goods and other foods in a variety of ways. The common use is to insert a filler cream into a baked pastry by injection. Another common method is to use a filler cream as a laminate or "sandwich" material between two cookie base cakes.

Filler cream compositions are generally comprised of sucrose or sucrose in combination with other sugars, flavorings, and oils or fats. Variations of the ingredients of a filler cream composition can lead to significantly different properties in a filler cream. Sugar combinations can cause a filler cream to be too sweet for eating in large quantities or, if artificial sweeteners are used, the filler cream can be too bitter for consumer acceptance.

The oil or fat used in filler creams can be a single oil or fat or a mixture of oils or fats. For purposes of this invention any oil or fat or mixture thereof used in a filler composition is identified by the term "oleaginous composition". Desirable oleaginous compositions used in filler creams for sandwich cookies are firm, but soft or "spreadable" at ordinary storage temperatures. Desirable oleaginous compositions must have good whipping and creaming properties that develop a filler cream with a light, consistent texture during whipping and aeration process steps. Also, desirable oleaginous compositions have a palatable flavor with little or no after taste and produce a filler cream that dissolves rapidly at body temperature when consumed. Oleaginous compositions used in commercial filler creams must have good shelf storage properties.

It is desirable for a filler cream to have a short "plastic range" in which there is a high solid fat content at low temperatures and approximately no solid fat content above body temperature. The term, plastic range, refers to the temperature range in which a filler cream fat or oleaginous composition is neither completely solid nor completely liquid. In this range the filler cream fat is pliable, but not completely fluid. A typical filler cream is manufactured from a soybean oil based oleaginous composition and sugar.

The whipping or aerating qualities of an oleaginous composition refer to the ability of that oleaginous composition to hold air incorporated into it. Air is sparged into the oleaginous composition as it is mixed at a temperature of about 95 degrees F. The air is desirably retained by the filler cream at room temperature for several months. Desirable whipping or aerating qualities in an oleaginous composition produce a filler cream that is "light" on the palate when consumed. Light characteristics of a filler cream are best understood by comparing a whipped cream product to a solid fat product such as margarine. A solid fat product melts slowly on the tongue and leaves an oleaginous coating. A whipped cream product dissolves rapidly and leaves little or no oily after taste. Aeration also controls firmness of the filler cream. Generally, increasing the aeration of a filler cream increases its softness.

The characteristics of an oleaginous composition can be altered without changing the source of the oils or fats in the composition. This is done by altering the amount of hydrogenation of the oils, the ratio of various oils to one another in the composition, and the amount of fractionation of the oils. Increased hydrogenation or fractionation usually imparts greater plasticity to an oleaginous composition. A reference detailing the properties of various food oils is Weiss, *Food Oils And Their Uses,* The AVI Publishing Company (2d ed. 1983).

Filler cream compositions known in the art of producing cookies are usually made from inexpensive oils or fats such a soybean oil and are processed so as to achieve a stiff filler cream, which can be applied to base cakes of cookies without the use of high temperatures. These filler creams are then quickly solidified in cooling apparatuses and remain solid and firm throughout three months or more of storage. Good storage or shelf stability characteristics are frequently achieved in a filler cream at the sacrifice of desirable mouth feel characteristics. As a result traditional filler creams made from inexpensive oils or fats and used in sandwich cookies leave an oily or waxy after taste and remain firm and partially solid at body temperature.

The shelf life of a filler cream can be improved by incorporating antioxidants into the oleaginous composition. Antioxidants prevent the development of undesirable flavors and odors associated with rancidity of fats or oils present in the filler cream. A three to nine month shelf life is desirable for commercial filler creams. Desirable shelf life or stability characteristics include resistance to structural, microbial, flavor, and color degradation.

U.S. Pat. No. 3,244,536 to Kidger discloses a process for making a traditional filler cream used in sandwich cookies. The oleaginous composition used in this invention contains two components. The first component is a commercially hydrogenated fat with a high content of $C_{18}$ fatty acids. The second component, which is a vegetable oil containing component, has a high proportion of lauric acid. These two components are blended and subjected to interesterification. Any animal fats or vegetable oils can be used as the first component for this invention. Tallow and lard are preferred for use as the second component. The vegetable oils used for the first component are identified in the various embodiments as coconut oil and palm kernel oil.

U.S. Pat. No. 2,359,228 to Lloyd et al. discloses a filler cream which has good storage properties that are achieved by incorporating dried starch conversion syrup solids into the cream. The substitution of dextrose with dry corn syrup stabiliees the moisture content within the final cookie product without producing a "gritty" filler cream.

U.S. Pat. No. 4,410,552 to Gaffeny et al. discloses an example of a filler cream. In this patent the filler cream is used for chocolate candies in which the oleaginous composition is altered to improve and enhance "mouth feel". The materials used in this invention are a combination of fats, sugars, water, and colloid substances. This combination is mixed and whipped together into a semi-plastic mass. The cream filler that is obtained, it is taught, does not have a texture which is either sticky or fatty-like.

U.S. Pat. No. 4,310,557 to Suggs et al. discloses food emulsifiers which are useful in producing filler creams and other products. The emulsifiers can produce products that are light in texture.

The present invention provides a soft filler cream for use with sandwich cookies and other foods that is soft at room temperature yet is structurally stable during simulated adverse transport conditions. The filler cream has a smooth, non-gritty texture and exhibits quick "get away" characteristics upon consumption. As used herein "get away" characteristics means the perception of rate of dissolution of the filler cream in the mouth. A filler cream with "quick get away" characteristics is one which is perceived by an expert taste panel as dissolving, melting, changing from solid to liquid, or disappearing quickly or rapidly in the mouth, without a waxy or oily after taste. In the filler creams of the present invention, an oleaginous composition which has a solid fat index of from about 9 percent to about 20 percent at 80 degrees F., from about 4 percent to about 11 percent at 92 degrees F., and from about 1 percent to about 4 percent at 100 degrees F. is used to provide a stable, soft texture.

SUMMARY OF THE INVENTION

The filler cream of this invention comprises a soybean oil containing oleaginous composition mixed with sugar and preferably a flavoring. The oleaginous composition has a solid fat index of from about 9 to about 20 percent at 80 degrees F., from about 4 percent to about 11 percent at 92 degrees F., and from about 1 percent to about 4 percent at 100 degrees F. The ingredients are aerated and mixed to produce a composition which has a specific gravity of from about 0.70 to about 1.20, preferably from about 0.77 to about 1.0, most preferably from about 0.85 to about 0.95. The filler creams of the present invention are soft at room temperature yet are structurally stable when subjected to simulated adverse transport conditions. The filler creams of the present invention exhibit a non-gritty, smooth texture and "quick get away" characteristics. Rapid melting of the oleaginous composition enables the sugar and any flavoring ingredients to quickly coat the tongue giving a rapid flavor sensation. The oleaginous composition preferably comprises a vegetable oil having a beta prime crystal structure in its most stable state and a vegetable oil having a beta crystal structure in its most stable state.

DETAILED DESCRIPTION OF THE INVENTION

The filler cream of this invention comprises sugar and a soybean oil-containing oleaginous composition. The oleaginous composition has a solid fat index of: a) from about 9 to about 20 percent, preferably from about 11 percent to about 15 percent, at 80 degrees F., b) from about 4 percent to about 11 percent, preferably from about 5 percent to about 8 percent at 92 degrees F., and c) from about 1 percent to about 4 percent, preferably from about 1 percent to about 3 percent material at 100 degrees F. At solid fat indices within these ranges, the filler/creams are substantially softer than filler creams made with oleaginous compositions having higher solid fat indices. However, the structural stabilities of the filler creams of the present invention, when subjected to simulated adverse transport conditions, are unexpectedly high for the substantial increase in softness. Stability under the simulated adverse transport conditions decreases quickly as the solid fat indices are lowered below the above ranges.

The filler creams in accordance with the present invention also exhibit quicker get away characteristics and provide a smooth, non-gritty mouthfeel. The oleaginous composition should have a solid fat index of less than about 1.5, but preferably at least about 0.3 at 104 degrees F. to contribute to stability of the filler cream without imparting a waxy mouthfeel. The solid fat indice of the oleaginous composition should be from about 20 percent to about 30 percent, preferably from about 21 percent to about 27 percent at 70 degrees F. to contribute to a soft texture and to facilitate continuous mass production of sandwich cookies. Decreasing the solid fat index at 70 degrees F. may adversely affect the formability of the filler cream upon deposition on the base cake or may increase the time needed for firming of the filler cream. The fluidity may be too high to form a laminate which retains its shape at the time it is deposited on the base cake or at the time the second base cake is placed upon the deposited filler cream. The solid fat index of the oleaginous compositions is suitably from about 31 to about 51 percent, preferably from about 40 percent to about 47 percent, at 50 degrees F.

Oleaginous compositions containing soybean oil and one or more other oils and having a solid fat index according to the above ranges can be obtained from numerous sources, such as oleaginous compositions can have numerous mixtures of either fractionated or unfractionated oils and oils having various degrees of hydrogenation.

The preferred oleaginous compositions comprise soybean oil and palm kernel oil alone, or in combination with cotton seed oil. Each of the oils may be modified by being partially hydrogenated, fractionated, and interesterified so as to obtain an oleaginous composition having solid fat indices according to the above ranges. The amount of soybean oil is from about 10 percent by weight to about 55 percent by weight, based upon the total weight of the oleaginous composition. Complete replacement of soybean oil is not desired because of the increased cost of other oils, however, use of soybean oil alone generally results in a "waxy" mouthfeel. The soybean oil and palm kernel oil are used in ratio amounts of about 45 percent to about 55 percent soybean oil and about 55 percent to about 45 percent of palm kernel oil, wherein the percentages add up to 100 percent by weight. In these preferred oleaginous compositions, any soybean oil stearine percent may be replaced with cotton seed oil stearine to obtain a solid fat index of about 1 percent to about 3 percent at 100 degrees F. and to avoid a waxy mouthfeel. Suitably, about 1 percent to about 3 percent of cotton seed oil stearine having a melting point of from about 152 degrees to 158 degrees F. is used to replace an about equal or slightly smaller amount of soybean oil stearine having a melting point of from about 141 degrees F. to about 147 degrees F. The weight percentages of cotton seed oil stearine are based upon the total weight of the oleaginous composition. It is believed that the cotton seed oil stearine forms a lower melting eutectic or eutectoid than does the soybean oil stearine or promotes the formation of a stable, lower melting crystal form.

Suitable amounts of cotton seed oil are from about 25 percent to about 75 percent. A preferred oleaginous composition comprises from about 40 percent by weight to about 60 percent by weight cotton seed oil, from about 33 percent by weight to about 18 percent by weight soybean oil, and from about 18 percent to about 33 percent by weight palm kernel oil, the percentages adding up to 100 percent by weight.

Generally, the cotton seed oil alone should have a higher solid fat index than the oleaginous composition comprising the three vegetable oils at 80 degrees F., 92 degrees F., and 100 degrees F. and typically also at 70 degrees F. and 104 degrees F. A preferred cotton seed oil has a solid fat index of from about 31 percent to about 33 percent at 70 degrees F., from about 25 percent to about 28 percent by weight at 80 degrees F., from about 15 percent to about 18 percent at 92 degrees F. from about 6 percent to about 7 percent at 100 degrees F., and from about 2 percent to about 4 percent at 104 degrees F. A mixture of palm kernel oil and soybean oil which may be combined with the preferred cotton seed oil has a solid fat index of from about 46 percent to about 52 percent at 50 degrees F., about 26 percent to about 33 percent at 70 degrees F., from about 9 percent to about 15 percent at 80 degrees F., from about 0 percent to about 5 percent at 92 degrees F., and less than 1 percent at 100 degrees F.

It is believed that the cotton seed oil forms lower melting eutectics or eutectoids with the other vegetable oils or promotes their crystallization into a stable, lower melting crystalline form, such as beta prime. The use of: (a) a vegetable oil, such as cotton seed oil, having a beta prime crystal structure in its most stable state and (b) a vegetable oil such as soybean oil and palm kernel oil, having a beta crystal structure in its most stable state promotes a smoother mouthfeel than the use of beta crystals alone and a softer texture than the use of beta-prime crystals alone. Beta crystals are generally coarser than beta-prime crystals which may tend to result in a less smooth texture. The beta-prime crystals however, tend to pack better which increases density. A mixture of beta-prime crystals and beta crystals would hinder packing of the beta-crystals and thereby promote softness. Other vegetable oils which may be substituted for the palm kernel oil, cotton seed oil, or soybean oil, in whole or in part include: (a) palm oil and rapeseed oil which have a beta-prime crystal ,structure in their most stable state, and (b) coconut oil and sunflower oil which have a beta crystal structure in their most stable state.

The oleaginous composition may contain an emulsifier, such as polyglycerol esters, in a minor amount to assist in the incorporation of sugar and other ingredients into the oleaginous composition provided it does not adversely affect formability and set-up time of the filler cream.

The sugar used is typically sucrose, but can be a combination of sucrose with other sugars including fructose, dextrose, lactose, and mixtures thereof. Filler cream compositions containing less than about 40 percent by weight oleaginous composition and more than about 60 percent by weight sugar, based upon the total weight of the sugar and oleaginous composition are preferred because of: (1) the relatively higher cost of the oleaginous composition and (2) the risk of melting of the oleaginous composition during adverse summertime storage and transportation temperatures. If any of the oleaginous composition melts, there would be more sugar available to be coated to retain the oil and to retain the structure of the filler cream and baked good.

However, as the weight percent of the oleaginous composition decreases, the filler is generally perceived as less creamier and more gritty as the particle size of the sugar increases. To provide a creamy, non-gritty texture, at low weight percentages of oleaginous compositions: 1) the sugar may be preground or the mixture of sugar and oleaginous material may be ground and, 2) the oleaginous composition should be at least about 32 percent by weight, based upon the total weight of the sugar and oleaginous composition. The filler cream compositions most preferably comprise from about 36 percent to about 38 percent by weight of the oleaginous composition and from about 62 percent to about 34 percent by weight of the ground sugar, based upon the total weight of the ground sugar and oleaginous composition. The percentages of sugar refer to sucrose alone or to mixtures of sucrose with other sugars such as fructose, dextrose, or lactose. Although costs would be higher, 40% by weight or more of the oleaginous composition may be used with coarser sugars during winter months to obtain filler creams having a creamy texture and quick get away. More than about 45 percent oleaginous composition in the cream filler generally causes the cream filler to be too thick or "heavy" when consumed.

The sugar is sifted into the oleaginous composition before air sparging, mixing, and cooling. Commercially available sugars, such as fine granulated table sugar, or 4X, 6X, 10X, or 12X sugars or mixtures of sugars may be used in the present invention. However, grinding of coarse sugars to a finer particle size is more economical than the use of 10X or finer sugars. The finer or powdered sugars tend to densify and agglomerate upon storage prior to incorporation into the filler. A preferred sugar size is less than 2 percent retained on a 200 mesh (about 74 microns) screen and less than 16 percent retained on a 325 mesh (about 44 microns) screen. It is also preferred that less than 0.5 percent is retained on a 100 mesh screen (about 150 microns). A particle size of less than 40 microns is most preferred for obtaining non-gritty, smooth filler cream textures, particularly when the filler composition contains from about 36 percent to about 38 percent of the oleaginous composition, based upon the total weight of the oleaginous composition and sugar.

The filler cream of this invention may include additives which do not adversely affect formability, set-up time, softness, or smoothness of the filler cream. Exemplary of additives which may be used are a stiffener ingredient, a stabilizer, a flavoring, and mixtures thereof. A desirable stiffener is non-fat milk powder which can be added in an amount between about 3 percent and about 10 percent based upon the weight of the filler cream. Excessive amounts of non-fat milk powder may cause the final texture of the filler cream to have a "gritty" mouth feel. The absence of a stiffener does not adversely affect the quick get away properties of the filler cream. Dextrose and/or edible fused silica can be used in amounts up to about 10 percent by weight as a stabilizer for the filler cream, based upon the weight of the filler cream. In amounts above about 5 percent, dextrose tends to impart a cooling sensation to the filler cream during consumption.

Suitable amounts of flavorings which can be added to the filler cream range up to about 1 part by weight of flavoring, based upon the weight of the filler cream. Typical flavorings which can be used are vanilla, chocolate, coffee, and peppermint. Numerous suitable flavorings and extracts are commercially available. Vanilla is the preferred flavoring.

Lecithin is conventionally used as a processing aid to improve flow properties of a filler cream slurry. However, it is not needed in the filler creams of the present invention.

The filler cream of this invention can be prepared by first heating the oleaginous composition to between about 105 degrees F. and about 120 degrees F. Flavorings and any non-sugar ingredients, such as non-fat dry milk powder, are added to the heated oleaginous composition. Sugar is then added to this mixture. The sugar is not dissolved in the oleaginous composition, but is added with mixing to form a suspension.

The mixture of oil, sugar, and additives is aerated and mixed simultaneously. As the air sparging or aeration step begins, the temperature of the mixture is reduced to promote sufficient crystallization of the oleaginous composition for formation of the filler cream laminate. The temperature is reduced to below about 80 degrees F., typically to below about 78 degrees F. The reduction in temperature of the mixture occurs within approximately 5 minutes and is best performed in a mixing machine having three or more distinct temperature reduction zones. Such mixing machines, by reducing the temperature of the mixture or filler cream composition, produce a high concentration of beta-prime fat crystals in the filler cream. Beta-prime fat crystals impart stable aerating properties to a filler cream.

The step of air sparging, which includes mixing and cooling the filler cream composition, is used to adjust the specific gravity of the filler cream within the range of from about 0.70 to about 1.20. The addition of sugar and the other ingredients to the heated oleaginous composition lowers the temperature of the "slurry" or filler cream composition to between 95 degrees F. and 100 degrees F. At this temperature the filler cream composition has a specific gravity of over about 1.20 to approximately 1.3. The air sparging and rapid mixing or whipping of the slurry is conducted to obtain a filler cream specific gravity of from about 0.70 to about 1.20. As the concentration of air in the filler increases, or the specific gravity increases, quick get-away characteristics and softness tend to increase and the stability under simulated adverse transport conditions tend to decrease. A preferred specific gravity for the filler is from about 0.77 to about 1.0, more preferably from about 0.85 to about 0.95.

The base cakes or cookie pieces used with a filler cream, according to this invention, need not be made from any special formulas. A soft base cake breaks apart more easily when eaten by a consumer. A hard base cake tends to resist breakage and can cause a filler cream to be squeezed out of the sides of a sandwich cookie. The firmness of the filler creams made with soybean oil according to this invention is sufficient to resist being squeezed out from between the base cakes when a cookie is eaten.

With some base cakes an oil migration from the filler cream into the cake can occur during prolonged storage. This problem can be reduced or eliminated by altering the base cake formula to include less shortening or oil. After manufacturing the cookies the oil from the filler cream migrates into the base cakes to produce an acceptable oil concentration in the base cakes. This migration occurs over a period of a few days or weeks. Alternatively, a film coating or wax coating can be applied to the layer of a base cake that receives the filler cream. These coatings act as a barrier to the oil migrating from the filler cream.

The following examples further illustrate the present invention. All percentages and parts are by weight and all temperatures are in degrees F. unless otherwise indicated.

EXAMPLE I

The ingredients and their relative amounts used to prepare a filler cream were:

| INGREDIENTS | QUANTITY | |
| --- | --- | --- |
| | lbs. | ozs. |
| Sucrose, 6X | 166 | 10 |
| Oleaginous Composition | 100 | 0 |
| Vanillin | 0 | 2.46 |

The oleaginous composition was a mixture of about: (a) 50 percent by weight of a blend of soybean oil and palm kernel oil and (b) 50 percent by weight cotton seed oil. The blend had about equal parts by weight of soybean oil and palm kernel oil. These oils were modified so as to obtain the indices (SFI) and Mettler Drop points for the blend, the cotton seed oil, and the oleaginous composition as follows:

| | Soybean Oil/ Palm Kernel Oil Blend | Cotton Seed Oil | Oleaginous Composition |
| --- | --- | --- | --- |
| SFI at 50° F. | 47.9 | 45.3 | 41.0 |
| SFI at 70° F. | 28.4 | 31.8 | 21.4 |
| SFI at 80° F. | 11.4 | 26.5 | 15.0 |
| SFI at 92° F. | 3.0 | 16.3 | 7.4 |
| SFI at 100° F. | 0.7 | 6.4 | 1.4 |
| SFI at 104° F. | 0.2 | 2.8 | 0.4 |
| Drop Point (° F.) | 91.6 (33° C.) | 104.2 | 105.1 |

The oleaginous composition was heated to about 110 to 115 degrees F. with mixing. The vanillin was added to the heated oils. The 6X sugar was added slowly to the mixture with continued mixing. The resulting slurry had a temperature of about 104 degrees F.

Upon suspension of the sugar in the oleaginous composition, air sparging was begun in conjunction with rapid, simultaneous mixing and cooling of the composition to about 79 degrees F. The air sparging and mixing were continued until the filler cream obtained a specific gravity of about 1.01. The aerating, mixing, and cooling were performed in a Votator icing mixing machine. The filler cream was then transported to a temperature controlled sandwich unit and the filler cream was applied to bottom base cakes on a commercial. sandwich cookie manufacturing line. The top base cake was applied to the deposited filler cream to form a sandwich cookie. The cookies were packaged and stored in a temperature controlled room. Softness measurements were made on samples stored at about 77 degrees F. over a period extending about one month from production. The samples were taken out of storage and immediately tested. One of the base cakes was removed from each of about 33 cookies and LFRA instron readings were taken on the exposed filler cream. The filler cream was approximately 3/16 inches thick. The LFRA measurements were made using a 4 mm spherical probe, traveling a distance of about 3 mm at a speed of about 1 mm/sec to approximately the center of the circularly shaped exposed filler cream of each cookie. The average LFRA readings are presented in Table 1.

Packaged cookies were also subjected to simulated adverse transport conditions. Four days after production, initial stack height measurements for six packages of cookies which had been kept at room temperatures were made by measuring the stack height of the right hand (label facing up) column of cookies in each package. Each package contained three columns with 11 cookies per column. The six packages were then placed in a temperature controlled storage room. The room was kept at about 100 degrees F. and the cookies were allowed to equilibrate overnight. The next day, the packages were taken out of storage and immediately fixedly strapped in a vertical position to a vibratory table. The table and packages were vibrated at 11–12 hertz at 1.0G for 30 minutes. The packages were allowed to equilibrate to room temperature and the stack height of each right hand column of cookies was measured. The average initial stack height, the average stack height loss, the range of values for the stack height loss, and the average stack height loss for the six samples are presented in Table II.

EXAMPLE II

The ingredients and their relative amounts used to prepare a filler cream were the same as used in Example except the 100 lbs. of the oleaginous composition of Example I was replaced by 100 lbs. of an oleaginous composition which was a blend of about equal parts by weight of soybean oil and palm kernel above modified to obtain the solid fat indices (SFI) and Mettler drop point for the oleaginous composition as follows were:

| | |
|---|---|
| SFI at 50° F. | 46.4 |
| SFI at 70° F. | 26.7 |
| SFI at 80° F. | 12.2 |
| SFI at 92° F. | 6.2 |
| SFI at 100° F. | 2.3 |
| SFI at 104° F. | 1.4 |
| Drop Point (° F.) | 99.9 |

The cookies were prepared, packaged and stored, and subjected to softness measurements and simulated adverse transport conditions as in Example I except: (a) the sparged slurry was cooled to about 76 degrees F. instead of 79 degrees F., and (b) the specific gravity of the filler cream was about 0.95 instead of 1.01. The average LFRA readings obtained in the softness measurements are in Table 1. The stack height data obtained from subjecting the packaged cookies to the simulated adverse transport conditions is presented in Table 2.

EXAMPLE III

The ingredients and their relative amounts used to prepare a filler cream were the same as used in Example I except the 100 lbs. of the oleaginous composition of Example I was replaced with a mixture of: (a) about 75 lbs. of the soybean oil/palm kernel oil blend of Example I, and (b) 25 lbs. of the cotton seed oil of Example I. The solid fat indices (SFI) and Mettler drop points for the mixture were:

| | |
|---|---|
| SFI at 50° F. | 44.6 |
| SFI at 70° F. | 24.7 |
| SFI at 80° F. | 12.2 |
| SFI at 92° F. | 5.8 |
| SFI at 100° F. | 2.0 |
| SFI at 104° F. | 1.7 |
| Drop Point (° F.) | 93.4 |

The cookies were prepared, packaged and stored, and subjected to softness measurements and simulated adverse transport conditions as in Example I except: (a) the slurry prior to air sparging had a temperature of about 109 degrees F. instead of 104 degrees F., (b) the sparged slurry was cooled to about 77 degrees F. instead of 79 degrees F., and (c) the specific gravity of the filler cream was about 0.97 instead of 1.01. The average LFRA readings obtained in the softness measurements are in Table 1. The stack height data obtained from subjecting the packaged cookies to the simulated adverse transport conditions is presented in Table 2.

COMPARATIVE EXAMPLE I

The ingredients and their relative amounts used to prepare a filler cream were the same as used in Example I except the 100 lbs. of the oleaginous composition of Example I was replaced with 100 lbs. of a soybean oil filler fat. The solid fat indices (SFI) and Mettler drop points for the soybean oil filler fat were:

| | |
|---|---|
| SFI at 50° F. | 45.6 |
| SFI at 70° F. | 30.4 |
| SFI at 80° F. | 25.4 |
| SFI at 92° F. | 13.3 |
| SFI at 100° F. | 7.3 |
| SFI at 104° F. | 5.1 |
| Drop Point (° F.) | 107.8 |

The cookies were prepared, packaged and stored, and subjected to softness measurements and simulated adverse transport conditions as in Example I except: (a) the sparged slurry was cooled to about 76 degrees F. instead of 79 degrees, and (b) the specific gravity of the filler cream was about 1.03 instead of 1.01. The average LFRA readings obtained in the softness measurements are in Table 1. The stack height data obtained from subjecting the packaged cookies to the simulated adverse transport conditions is presented in Table 2.

COMPARATIVE EXAMPLE II

The ingredients and their relative amounts used to prepare a filler cream were the same as used in Example I except the 100 lbs. of the oleaginous composition of Example I was replaced with 100 lbs. of the soybean oil/palm kernel oil blend of Example I.

The cookies were prepared, packaged and stored, and subjected to softness measurements and simulated adverse transport conditions as in Example I except: (a) the slurry prior to air sparging had a temperature of about 106 degrees F. instead of 104 degrees F., (b) the sparged slurry was cooled to about 75 degrees F. instead of 79 degrees F., and (c) the specific gravity of the filler cream was about 1.1 instead of 1.01. The average LFRA readings obtained in the softness measurements are in Table 1. The stack height data obtained from subjecting the packaged cookies to the simulated adverse transport conditions is presented in Table 2:

TABLE 1

Comparison Of Average LFRA Readings For Filler Creams Stored At About 77° F.

| Number Of Days After Production | Example | | | Comparative Example | |
|---|---|---|---|---|---|
| | I | II | III | I | II |
| 4 | 150 | 114 | 158 | 625 | 155 |
| 6 | 73 | 66 | 55 | 274 | 36 |
| 8 | 64 | 59 | 52 | 255 | 35 |
| 11 | 70 | 67 | 54 | 279 | 46 |
| 13 | 69 | 64 | 53 | 267 | 43 |
| 18 | 69 | 65 | 55 | 293 | 45 |

TABLE 1-continued

Comparison Of Average LFRA Readings For Filler Creams Stored At About 77° F.

| Number Of Days After Production | Example I | Example II | Example III | Comparative Example I | Comparative Example II |
|---|---|---|---|---|---|
| 22 | 72 | 64 | 59 | 286 | 42 |
| 32 | 67 | 70 | 62 | 259 | 40 |

TABLE 2

Structural Stability Under Simulated Adverse Transport Conditions

| | Example I | Example II | Example III | Comparative Example I | Comparative Example II |
|---|---|---|---|---|---|
| Average initial stack height (inches) | 6.31 | 6.38 | 6.41 | 6.40 | 6.42 |
| Average stack height loss (inches) | 1.06 | 0.97 | 1.31 | 0.94 | 1.67 |
| Range of stack height loss (inches) | 1.00 to 1.25 | 0.88 to 1.25 | 1.13 to 1.38 | 0.88 to 1.00 | 1.25 to 2.00 |
| Average percent stack height loss | 16.8 | 15.2 | 20.4 | 14.7 | 26.0 |

As demonstrated by the data presented in Tables 1 and 2, when subjected to the simulated adverse transport conditions described in Example I: the substantially softer (as measured by the decrease in LFRA readings) filler creams of Examples I through III exhibited unexpectedly high structural stabilities (as measured by the percentage of stack height loss) compared to the structural stability of the filler cream of Comparative Example I. The increases in structural stability exhibited by the filler creams of Examples I to III over that of the filler cream of Comparative Example II was unexpectedly high for their increase in softness over the filler cream of Comparative Example I. For example, the percentage decrease of the LFRA readings on the 32nd day after production was about 85 percent [(259−40)/259×400] for Comparative Example I and ranged from about 73 percent to about 76 percent for Examples I, II, and III. However, the percentage reduction in the percent of stack height loss exhibited over the 26 percent loss for Comparative Example II unexpectedly ranged from about 22 percent to about 45 percent for Examples I, II, and III.

The percentage decreases in LFRA readings and the percentage reduction in the percent of stack height loss are presented in Table III:

TABLE III

Comparison Of Softness And Loss of Stack Height

| | % Decrease In LFRA Reading (day 32) Over Comparative Example I | % Reduction In % Stack Height Loss Over Comparative Example II* |
|---|---|---|
| Comparative Example II | 85% | not applicable |
| Example I | 74% | 35% |
| Example II | 73% | 42% |
| Example III | 76% | 22% |

*Calculated as (S − E)/S × 100% where S is the % stack height loss for Comparative Example II and E is the % stack height loss for either Example I, II, or III.

What is claimed is:

1. A filler cream comprising:
   (a) an oleaginous composition containing soybean oil and having a solid fat index of:
      (i) from about 31 to about 51 percent at 50 degrees F.,
      (ii) from about 20 to about 30 percent at 70 degrees F.,
      (iii) from about 9 to about 20 percent at 80 degrees F.,
      (iv) from about 4 to about 11 percent at 92 degrees F.,
      (v) from about 1 to about 4 percent at 100 degrees F., and
      (vi) less than about 1.5 percent at 104 degrees F., and
   (b) a sugar mixed into said oleaginous composition.

2. A filler cream according to claim 1 wherein the solid fat index of said oleaginous composition is:
   from about 40 to about 47 percent at 50 degrees F.,
   from about 21 to about 27 percent at 70 degrees F.,
   from about 11 to about 15 percent at 80 degrees F.;
   from about 5 to about 8 percent at 92 degrees F., and
   from about 1 to about 3 percent at 100 degrees F.

3. A filler cream as claimed in claim 2 wherein said soybean oil is from about 10 percent to about 55 percent of said oleaginous composition by weight.

4. A filler cream as claimed in claim 3 wherein a cotton seed oil is from about 75 to about 25 percent by weight of said oleaginous composition.

5. A filler cream as claimed in claim 1 wherein the amount of said oleaginous composition is at least about percent by weight, based upon the total weight of the sugar and oleaginous composition.

6. A filler cream as claimed in claim 5 wherein said sugar has a particle size of less than about 40 microns.

7. A filler cream as claimed in claim 1 wherein the amount of said oleaginous composition is from about 36 percent by weight to about 38 percent by weight, based upon the total weight of the sugar and the oleaginous composition.

8. A filler cream as claimed in claim 4 wherein the cotton seed oil is from about 40 percent by weight to about 60 percent by weight, based upon the weight of the oleaginous composition.

9. A filler cream as claimed in claim 2 wherein said soybean oil is from about 18 percent by weight to about 33 percent by weight, based upon the weight of the oleaginous composition.

10. A filler cream as claimed in claim 2 wherein said oleaginous composition comprises soybean oil, cotton seed oil and palm kernel oil.

11. A filler cream as claimed in claim 10 wherein said cotton seed oil is from about 25 percent by weight to about 75 percent by weight, based upon the weight of the oleaginous composition.

12. A filler cream as claimed in claim 11 wherein said soybean oil is from about 33 percent by weight to about 18 percent by weight, and said cotton seed oil is from about 40 percent by weight to about 60 percent by weight, based upon the weight of said oleaginous composition.

13. A filler cream as claimed in claim 1 wherein the specific gravity is between about 0.85 and about 0.95.

14. A filler cream as claimed in claim 11 wherein the solid fat index of said cotton seed oil is:
 from about 25 percent to about 28 percent at 80 degrees F.,
 from about 15 percent to about 18 percent at 92 degrees F., and
 from about 6 percent to about 7 percent at 100 degrees F.

15. A filler cream as claimed in claim 1 wherein said oleaginous composition comprises a vegetable oil having a beta prime crystal structure in its most stable state and a vegetable oil having a beta crystal structure in its most stable state.

16. A filler cream as claimed in claim 1 wherein said oleaginous composition has cotton seed oil stearine in an amount of from about 1 percent by weight to about 3 percent by weight, based upon the total weight of the oleaginous composition, said cotton seed oil stearine having a melting point of from about 141 degrees F. to about 147 degrees F.

17. A sandwich cookie comprising the filler cream of claim 5 as a laminate separating two cookie base cakes.

18. A process for making a filler cream, comprising:
 (a) heating an oleaginous composition having a solid fat index of:
  (i) from about 9 to about 20 percent at 80 degrees F.,
  (ii) from about 4 percent to about 11 percent at 92 degrees F., and
  (iii) from about 1 percent to about 4 percent at 100 degrees F.,
 (b) blending a sugar and said oleaginous composition to form a slurry, and
 (c) aerating and mixing said slurry with simultaneous cooling to a temperature below about 80 degrees F. to form the filler cream.

19. A process as claimed in claim 18 wherein the amount of said oleaginous composition is at least about percent by weight, based upon the total weight of the sugar and oleaginous composition, and said sugar has a particle size of less than about 40 microns.

20. A process as claimed in claim 18 wherein said slurry is subjected to grinding to reduce the particle size of said sugar to less than 40 microns.

21. A process as claimed in claim 19 wherein the aeration provides a filler cream having a specific gravity of between about 0.85 and about 0.95.

22. A process as claimed in claim 18 wherein said oleaginous composition has a solid fat index of:
 from about 21 to about 27 percent at 70 degrees F.,
 from about 11 to about 15 percent at 80 degrees F.,
 from about 5 to about 8 percent at 92 degrees F., and
 from about 1 to about 3 percent at 100 degrees F.

23. A process as claimed in claim 22 wherein said oleaginous composition comprises a vegetable oil having a beta prime crystal structure in its most stable state and a vegetable oil having a beta crystal structure in its most stable state.

24. A process for making a filler cream comprising:
 (a) heating an oleaginous composition having a solid fat index of:
  (i) from about 31 to about 51 percent at 50 degrees F.,
  (ii) from about 20 to about 30 percent at 70 degrees F.,
  (iii) from about 9 to about 20 percent at 80 degrees F.,
  (iv) from about 4 to about 11 percent at 92 degrees F.,
  (v) from about 1 to about 4 percent at 100 degrees F., and
  (vi) less than about 1.5 percent at 104 degrees F., and
 (b) blending a sugar and said oleaginous composition to form a slurry, and
 (c) aerating and mixing said slurry with simultaneous cooling to form a filler cream.

25. A process as claimed in claim 24 wherein the aeration provides a specific gravity of between about 0.77 and about 1.0.

26. A process as claimed in claim 24 wherein the aeration provides a specific gravity of between about 0.85 and about 0.95.

27. A process as claimed in claim 26 wherein said oleaginous composition comprises from about 10 percent by weight to about 55 percent by weight soybean oil and from about 75 percent by weight to about 25 percent by weight cotton seed oil, based upon the weight of the oleaginous composition.

28. A filler cream comprising:
 (a) an oleaginous composition containing soybean oil and having a solid fat index of:
  (i) from about 9 percent to about 20 percent at 80 degrees F.,
  (ii) from about 4 percent to about 11 percent at 92 degrees F., and
  (iii) from about 1 percent to about 4 percent at 100 degrees F., and
 (b) a sugar admixed with said oleaginous composition, the amount of said oleaginous composition being at least about 32 percent by weight, based upon the total weight of the sugar and oleaginous composition, said filler cream having a specific gravity of between about 0.77 and about 1.0.

29. A filler cream as claimed in claim 28 wherein the amount of said oleaginous composition is from about 36 percent to about 38 percent by weight, based upon the total weight of the sugar and oleaginous composition, and the amount of soybean oil is from about 10 percent by weight to about 55 percent by weight based upon the weight of the oleaginous composition.

30. A filler cream as claimed in claim 28 wherein the oleaginous composition comprises from about 40 percent to about 60 percent by weight of cotton seed oil.

31. A filler cream as claimed in claim 29 wherein said oleaginous composition has cotton seed oil stearine in an amount of from about 1 percent by weight to about 3 percent by weight, based upon the total weight of the oleaginous composition, said cotton seed oil stearine having a melting point of from about 141 degrees F. to about 147 degrees F.

32. A filler cream as claimed in claim 31 wherein a palm kernel oil is from about 55 percent by weight to about 45 percent by weight of said oleaginous composition.

33. A filler cream as claimed in claim 28 wherein the solid fat index of the oleaginous composition is:

(i) from about 11 percent to about 15 percent at 80 degrees F., (ii) from about 5 percent to about 8 percent at 92 degrees F., and (iii) from about 1 percent to about 3 percent at 100 degrees F.

34. A filler cream as claimed in claim 28 wherein the filler cream has a specific gravity of from about 0.85 to about 0.95.

35. A filler cream as claimed in claim 33 wherein the filler cream has a specific gravity of from about 0.85 to about 0.95.

* * * * *